March 24, 1953 C. E. GUMFORY 2,632,279
TRAP FOR SMALL ANIMALS
Filed Feb. 25, 1949 2 SHEETS—SHEET 1
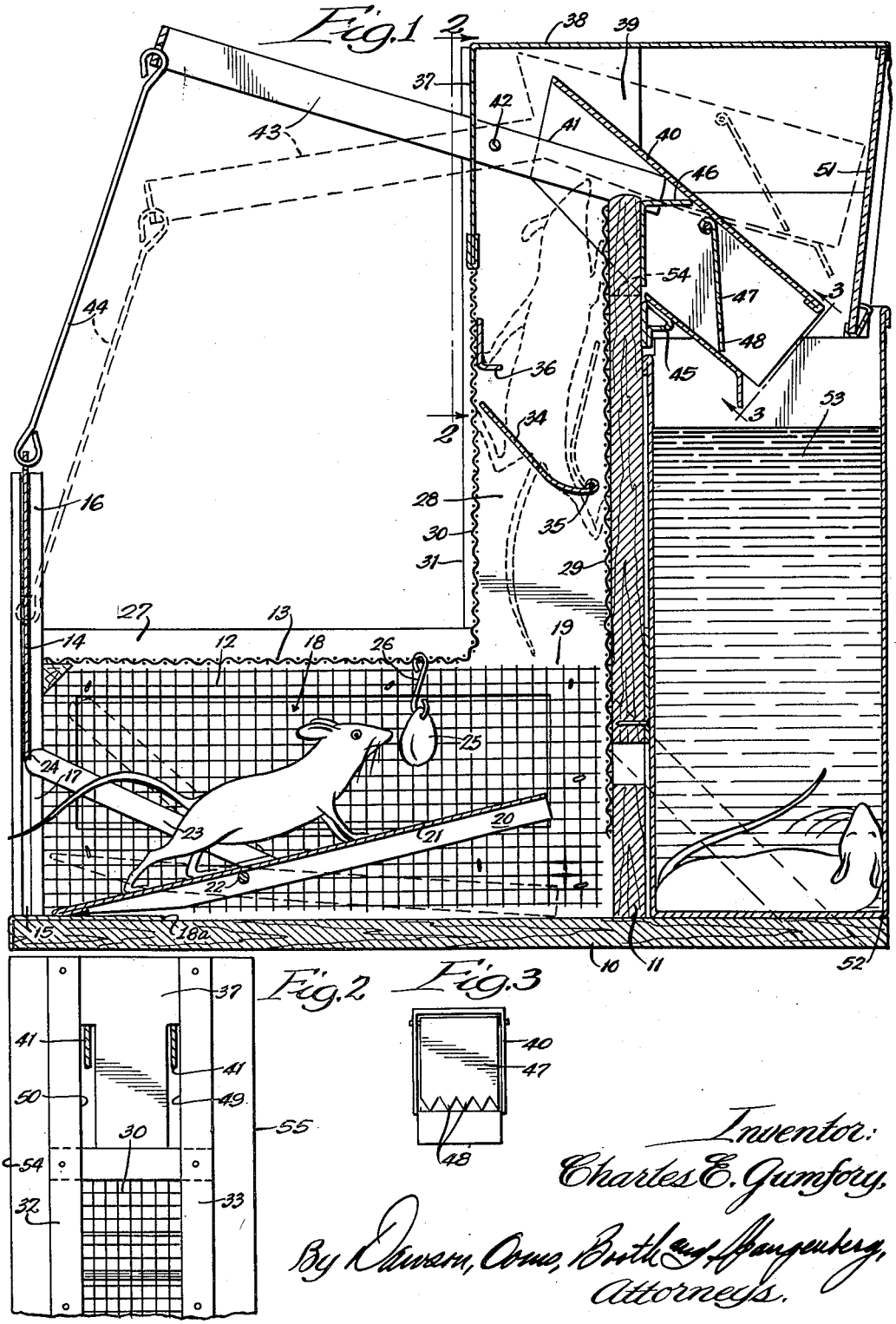
Inventor:
Charles E. Gumfory,
By Dawson, Ooms, Booth and Spangenberg,
Attorneys.

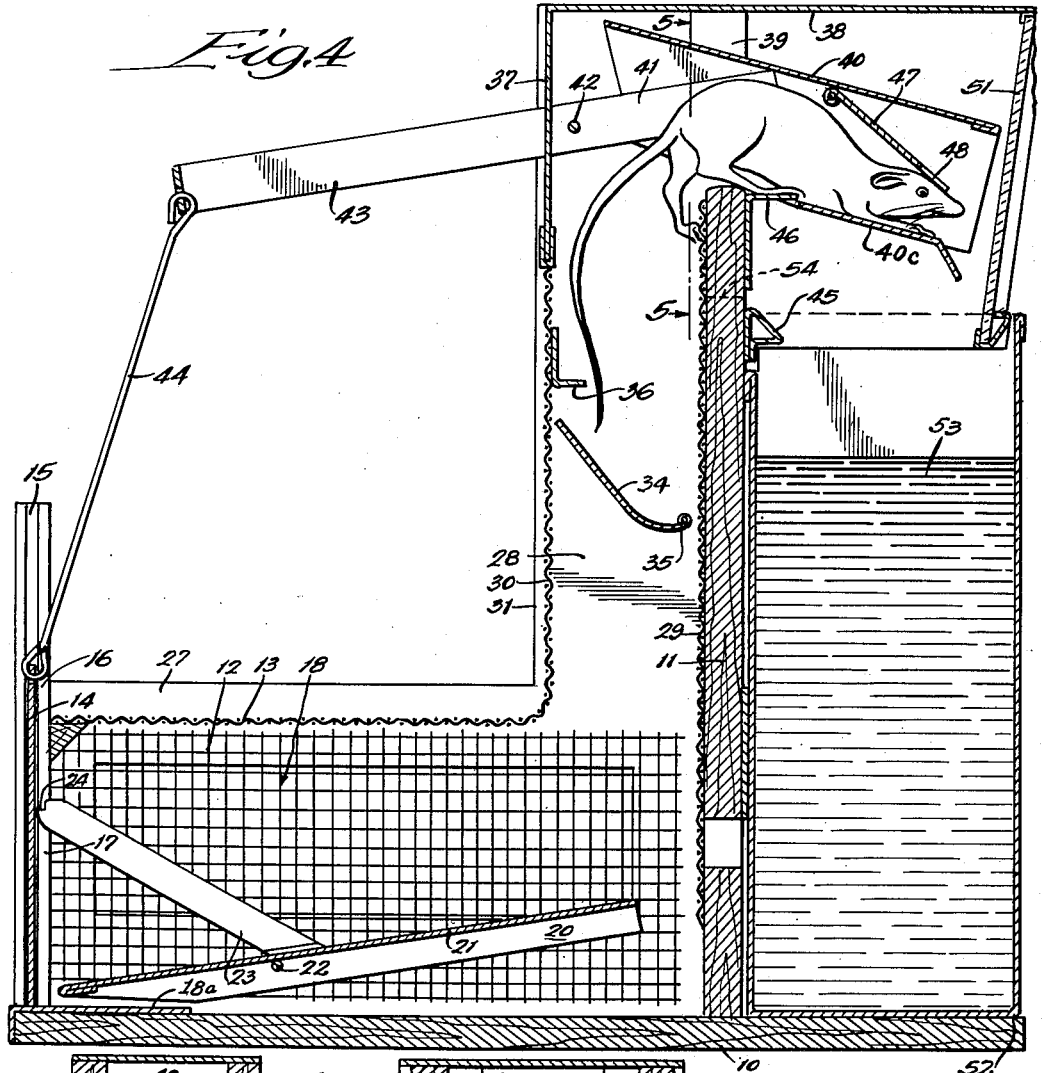
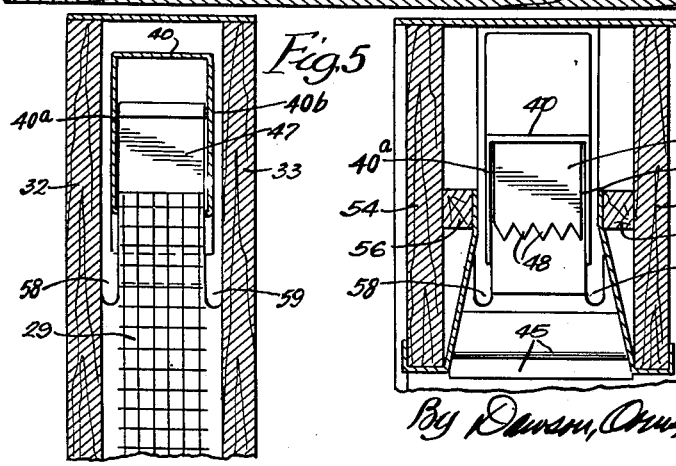

Patented Mar. 24, 1953

2,632,279

UNITED STATES PATENT OFFICE 2,632,279

TRAP FOR SMALL ANIMALS

Charles E. Gumfory, Tampico, Ill.

Application February 25, 1949, Serial No. 78,283

1 Claim. (Cl. 43—76)

This relates to a trap for small animals such as rats and mice and particularly to a trap which is characterized by certain new features of construction and operation which make the trap particularly effective where there are a large number of animals to be eliminated with a minimum of attention.

An object of the invention is to provide a trap for small animals and the like which automatically resets itself after trapping an animal. Another object is to provide a trap which will effectively trap a large number of small animals with a minimum of attention to the unit. Still another object is to provide a trap which is designed so as to provide easy and free access without frightening the animals.

A further object of the invention is to provide a trap for small animals which includes separate sections through which the animal advances and in which the trap is reset automatically after animal advances from one section to another. Other features and advantages will appear from the following specifications and drawings in which:

Fig. 1 is a vertical sectional view of the trap; Fig. 2 is a fragmentary detail sectional view taken along the line 2—2 of Fig. 1; Fig. 3 is a detail sectional view taken along the line 3—3 of Fig. 1; Fig. 4 is a vertical sectional view of the trap; Fig. 5 is a fragmentary vertical sectional view taken along the line 5—5 of Fig. 4; Fig. 6 is a fragmentary detail vertical sectional view showing the construction and support of the chute in the upper portion of the trap.

In the specific embodiment of the invention illustrated herein the trap is mounted on a base 10 which may be made of wood and which extends under the various sections of the trap. Upon the base 10 are supported the vertical partition 11 which also may be made of wood. Extending upwardly from the base 10 and secured to the partition 11 is the screen 12. A pair of these screens disposed parallel with respect to each other provide side walls for the chamber formed by the screens with the base 10 and the partition 11. Another screen 13 provides the ceiling for the same chamber.

A door 14 movable vertically in a slot 15 of the support 16 closes the chamber when in lower position and provides an opening at 17 for access to the chamber when the door is in upper position. As illustrated particularly in Fig. 1 a chamber 18 is thus formed by the base 10, the partition 11, screen side walls 12 and screen ceiling 13. The door 14 is adapted to open and close the end of the chamber. The ceiling screen 13 does not extend to the partition 11 and the space between the end of the screen 13 of the partition 11 provides an opening 19 at the end and top of the chamber.

Within the chamber 18 is a platform 20 which may be of wood but preferably provided with a sheet metal surface 21. The platform 20 is pivotally mounted on the pin 22. To the platform 20 is secured a trip lever 23 equipped at its end with a notch 24 for supporting the door 14 when the platform is in normal position as shown in full lines in Fig. 1. The platform is weighted and balanced so that it is in normal position with the forward end extending upwardly as seen in Fig. 1. With this construction the weight of an animal on the forward end of the platform will cause the forward end of the platform to swing downwardly to the dotted line position shown in Fig. 1 thereby disengaging the trip lever 23 and permitting the door 14 to fall downwardly and close the opening 17 to the chamber 18. When the forward end of the platform, however, is relieved of the weight of the animal it immediately returns to normal position with the trip lever 23 engaging the surface of the door which is now in its lower position. If the door is raised to its upper position the trip lever immediately engages its lower edge and supports the door in upper position.

A suitable bait 25 such as a piece of cheese may be supported in any desired manner, for example, by wire 26 from the screen forming the roof or ceiling of the chamber 18. A support 27 may be provided for to support the screens 12 and 13. Preferably the end of the base adjacent the opening 17 through which the animal enters the chamber 18 is covered with sheet metal as at 18a so as to provide a surface which may be engaged by the metal door to form a closure for the opening 17 which effectively prevents the animal raising the door or from gnawing away the wood base 10.

The vertical partition 11 extends upwardly substantially above the chamber 18 to provide one of the walls of the passage 28. The surface of the partition 11 which is exposed in the passage 28 is preferably covered with a screen 29. The opposite wall of the passage 28 is formed by the screen 30 which is carried by the wooden frame member 31.

As seen particularly in Fig. 2 side walls 32 and 33 extend between the rear wall 30 and the front wall 29 of the passage 28. A door 34 extends across the passage 28 for hinged movement therein and is supported by the hinge 35. A projection 36 extends into the passage from the wall 30. The rear wall 30 of the passage 28 extends upwardly to join a sheet metal section 37 which also forms the top wall 38 of the passage. The partition 11 terminates below the top wall 38 so as to provide an opening 39 extending upwardly from the passage. A rectangular metal chute 40 extends through this opening and is carried by the arm 41 which is pivotally mounted on the pin 42 within the passage 28. The rear end 43 of the arm is secured by a wire 44 or other suitable means to the door 14.

As indicated in Fig. 1, the arm 41 and chute 40 are movable in the opening 39. In lower position the chute engages and is supported by abutments 45 and 46. The chute is equipped with a hinged door 47 extending across the same and said door is equipped with serrations 48 at its lower end.

When a weight is placed on the forward end of the chute, such as occurs when an animal enters the chute, the chute and arm 41 move to the position shown in full lines in Fig. 1 and the wire 44 simultaneously raises the door 14 to open position. The sheet metal portion 37 of the rear wall 30 is equipped with a pair of slots 49 and 50 through which the arms 41 move up and down.

A glass plate 51 is placed in the forward wall of the unit in front of the opening of the chute so as to transmit light into the end of the chute. Below the chute and the glass plate is a tank 52 of metal or other suitable material. This tank is disposed immediately below the forward opening of the chute 40 and is adapted to be filled with water as at 53.

As seen particularly in Figs. 5 and 6, the side walls 32 and 33 of the passage 28 receive the rear end of the chute 40. A pair of walls 54 and 55 adjoin the side walls 32 and are spaced apart by a greater distance than the side walls 32 and 33. The walls 54 and 55 are equipped with braces 56 and 57 which support between them the chute 40. By reason of the spacing apart of the walls 54 and 55 by a distance greater than the width of the chute, light is permitted to pass beside as well as above the chute to the upper end of the passage 28.

As seen more clearly in Figs. 5 and 6 the upper end portion of wall 11 is provided with spaced vertical slots 58 and 59 adapted to receive the vertical sides 40a and 40b of chute 40 when it is swung downwardly under the weight of the animal. In the illustration given, it will be noted (Fig. 4) that the bottom wall 40c of chute 40 terminates at a spaced distance from the top of wall 11, and that abutment 46 provides a ledge which serves as a solid continuation of bottom wall 40c in the raised position of the chute. One important advantage of this structure is that the animal is encouraged to climb over the top of wall 11 and to enter chute 40 by the firm footing provided by the top of wall 11 and the abutment ledge 46. In consequence, the animal is well within the chute before it begins to swing downwardly, which tends to prevent him from retreating out of the chute. In addition, when the chute begins to swing downwardly the abutment ledge 46 strikes the underside of the animal and prods it into moving on through the chute and into the receptacle beneath the open rear end of the chute. The serrations 48 in the bottom edge of hinged door 47 cooperate with abutment ledge 46 in causing the animal once it is well within the chute to move on through the chute. When the animal has partially passed beneath door 47 so that serrated edge 48 is resting on top of the animal, an attempt to retreat within chute 40 will have a tendency to cause serrations 48 to dig into the top of the animal and thereby discourage it from retreating. Thus, the prodding of the animal by abutment ledge 46 tends to cause the animal to move out of the chute, and serrations 48 increase the likelihood that the animal will move on through the chute rather than retreating back into vertical passage 28.

In operation the trap is set with the various parts in the positions shown in full lines in Fig. 1. The door 14 is raised and the forward end of the platform 20 is elevated. As the animal views the bait 25 through the opening 17, he sees a chamber which is enclosed at least on two sides by screens. The platform 20 provides an inclined ramp leading to the bait. When the animal enters through the opening 17 and walks on the platform 20 the platform moves to its lower position shown in dotted lines in Fig. 1 before the animal reaches the bait. This causes trip lever 23 to move to the dotted line position shown in Fig. 1 and releases the door 14. The door 14 falls to its lower position being guided by the slots 15 in the support 16. In its lower position the door 14 closes the opening 17 and the animal is unable to leave the chamber 18 through this opening. The animal sees the passage 28 above the forward end of the chamber 18. This passage is light and offers a possibility of escape to the animal. Accordingly, the animal climbs upwardly through the passage 28 using the screens 29 and 30 for support as indicated in Fig. 1. The door 34 is pushed to the dotted line position shown in Fig. 1 and permits the animal to pass. As soon as the animal has passed the door 34, the door swings downwardly to close the passage so that the animal cannot return to the chamber 18.

When the animal reaches the upper end of the passage 28 he is at the rear end of the chute 40 and approaches the position seen in Fig. 4. In this position the animal sees ahead of him the light transmitted through the glass 51 into and around the chute 40. Upon advancing into the chute seeking escape, the animal moves the chute to the full line position seen in Fig. 1 and falls from the chute into the tank of water. When the animal's weight is removed from the chute, the chute and supporting arm 41 immediately return to the dotted line position of Fig. 1 and full line position of Fig. 4. However, in the meantime when the chute moved to lower position, the rear end 43 of the arm 41 was lifted and in turn lifted the door 14 to open position. The door is again supported by the trip lever 23 and the trap is reset for use.

In some instances, the animal may destroy the bait 25 before leaving the chamber 18. However, in most cases when the platform drops and releases the door 14 permitting the door 14 to close, the animal is frightened and loses all interest in bait.

With the construction embodied in this trap the platform 20 is so balanced as to return to elevated position as soon as the animal's weight is removed from it. This in turn moves the trip lever 23 to a position where it engages the surfaces of the door 14 and supports the door 14 as soon as the door is raised to elevated position.

The door 34 is readily moved aside as the animal moves upwardly in the passage 28 but immediately returns to closed position in the passage when the animal has passed.

The arrangement of the chute, the supporting arm 41 and the door 14, is such that as an animal moves upwardly in the chute the door is moved upwardly and supported by a notch 24 of the trip lever 23 in elevated position. As soon as the chute is tilted forwardly and the animal dropped into the tank of water, the chute returns to elevated position but the door 14 now being supported by the trip lever 23 remains in elevated position.

Although the invention has been illustrated in connection with certain specific embodiments, it will be apparent that modifications and changes may be made without departing from the spirit and scope of the invention.

I claim:

In a trap for small animals, the combination comprising a chamber having an entrance opening in the front wall and an exit opening in the top wall adjacent the rear wall communicating with an upwardly extending passage having generally vertical walls provided with means adapted to assist said animal in climbing said passage, the rear wall of said passage being a continuation of the rear wall of said chamber and terminating at a spaced distance from the top of said passage to allow said animal to climb over the top of said wall, and an open-ended chute swingably mounted above said rear wall and extending rearwardly therefrom, said chute having a top wall, vertical side walls, and a bottom wall terminating at a spaced distance from the top of said passage rear wall, said passage rear wall having spaced vertical slots in the top thereof receiving the sides of said chute when it tilts downwardly under the weight of the animal, a rearwardly-extending ledge member fixedly mounted adjacent the top of said passage rear wall and adapted to form a solid continuation of the bottom wall of said chute in its raised position and to form an abutment for the top of said chute in its lower position, whereby the animal is encouraged to climb over the top of said passage rear wall and thereby enter said chute because of the firm footing provided by the top of said wall and said ledge until said animal is well within said chute, and when said chute begins to swing downwardly said ledge strikes the underside of said animal and prods said animal into moving out of said chute, and a receptacle beneath the rear end of said chute adapted to retain said animal therein upon sliding from said chute into said receptacle.

CHARLES E. GUMFORY.

REFERENCES CITED

The following references are of record in the file of this patent:

UNITED STATES PATENTS

| Number | Name | Date |
| --- | --- | --- |
| 246,369 | Campbell | Aug. 30, 1881 |
| 567,201 | Smith | Sept. 8, 1896 |
| 638,476 | Ruckersberg | Dec. 5, 1899 |
| 1,138,132 | Marsh | May 4, 1915 |
| 2,128,808 | Fabian | Aug. 30, 1938 |